INVENTORS
Robert T. Florence
Richard E. Thomas
by McDougall, Hersh, Scott
and Ladd
Att'ys

United States Patent Office 3,522,072
Patented July 28, 1970

---

3,522,072
FILM TRANSPARENCY FOR IMAGING BY SPIRIT DUPLICATION
Robert T. Florence, Park Ridge, and Richard E. Thomas, Chicago, Ill., assignors to A. B. Dick Company, Niles, Ill., a corporation of Illinois
Filed Jan. 16, 1967, Ser. No. 609,469
Int. Cl. B41n 5/04, 1/12
U.S. Cl. 117—35.6             3 Claims

ABSTRACT OF THE DISCLOSURE

The invention is addressed to the production of copy by spirit duplication onto an impression medium in the form of a transparent film in which the film is coated to provide a transparent coating which is readily wet out by the fluids used in spirit duplication and is highly receptive to the imaging material transferred by spirit duplication whereby a film transparency is produced with single or multiple colors.

---

Figure 1:
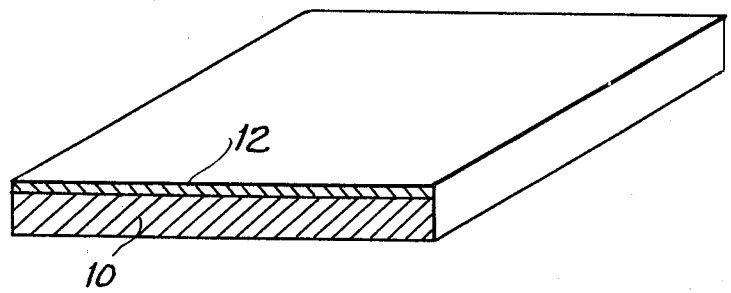

This invention relates to the field of spirit duplication and more particularly to film transparencies which can be used as impression media on which single or multiple color copy can be produced by spirit duplication and in which the impression medium has sufficient transparency and the image sufficient clarity for use of the film transparency as a projection medium.

Transparent films, such as films of polyester resins, cellulose acetate, polystyrene, polyvinylidene chloride, Mylar and the like have not been used successfully as impression media on which image transfer can be effected by spirit duplication because only a faint image is capable of being retained on the surface of the transparency either by reason of the surface smoothness of the transparency, the lack of wettability of the surface by the fluids used in spirit duplication or the lack of adhesion to the surface of the transparency for other reasons of a more subtle nature.

In addition, such film transparencies have a coefficient of friction to enable use alone or in combination with spirit duplicating paper for processing through the duplicating machine. As a result, special procedures and techniques are required for imaging a film transparency by spirit duplication.

To the present, it has been difficult to prepare multiple color transparencies on a single film. Where multiple colors are embodied in an image, it has been the practice to make use of transparencies for each color and then overlay the several sheets with the proper orientation for the development of a multi-color image. This not only entails a considerable expense in materials and labor but accurate registration presents a serious and difficult problem.

Thus, it is an object of this invention to produce and to provide a method for producing film which can be used in the preparation of film transparencies by spirit duplication; which has sufficient surface roughness and/or a high coefficient of friction to enable use in conventional spirit duplicating equipment alone or in combination with conventional impression media such as paper, which is readily wettable by the fluids used in spirit duplicating processes for development of an image of good copy quality and sufficient clarity to give projected images of good contrast; which is relatively insoluble in the fluids used in the spirit duplicating processes; which is capable of simple use as a single sheet multicolor transparency; which is of relatively low cost and formed of readily available materials and which can be stacked in admixture with copy paper so that one or more film transparencies can be prepared along with the duplication of paper copies by conventional spirit duplicating machines and which, therefore, does not require a special master or materials for spirit duplication.

Figure 2:
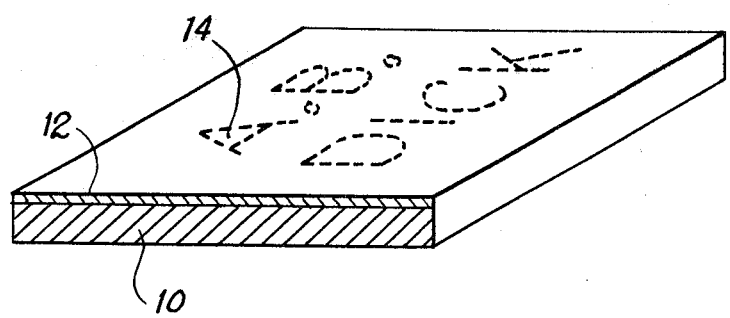

These and other objects and advantages of this invention will hereinafter appear and for purposes of illustration, but not of limitation, an embodiment of the invention is shown in the accompanying drawing, in which:

FIG. 1 is a perspective view partially in section of a film transparency embodying the features of this invention, and FIG. 2 is a prospective view partially in section of the film transparency of FIG. 1 with the image formed thereon.

The invention will be described with reference to films formed of polyester resin, Mylar resin, cellulose acetate, polystyrene, polyvinylidene chloride and the like, but it will be understood that the concept of this invention can be applied to other transparent film stock of other resinous or polymeric materials.

In accordance with the practice of this invention, a film 10 of the type described is coated on at least one surface with a coating composition that dries to form a transparent, adherent layer 12 which is strongly bonded to the underlying film base 10 and which is characterized by surface roughness and/or a relatively high coefficient of friction, good wettability by the spirit fluid with which the coated surface is wet before contact with the surface of the imaged master, which is not readily soluble in the spirit fluid, which is highly receptive to the imaging material for development of an image with sufficient contrast to give projected images of good readability.

The coating compositions of this invention can be represented by the following examples:

EXAMPLE 1

10 parts by weight of colloidal silica—30% solids (Du Pont Ludox HS)
1 part by weight polyvinylidene chloride—60% solids (Daran 220—Dewey & Almy Chemical Co.)

EXAMPLE 2

10 parts by weight of a 5% aqueous solution of polyvinyl alcohol (Elvanol 72-60—E. I. du Pont)
1 part by weight polyvinylidene chloride—60% solids (Daran 220—Dewey & Almy Chemical Co.)

EXAMPLE 3

10 parts by weight of a 5% aqueous dispersion of polyvinyl acetate (Gelvatol 1-60—Shawinigan Chemical Company)
1 part by weight of polyvinylidene chloride—60% solids (Daran 220—Dewey & Almy)

EXAMPLE 4

10% aqueous dispersion of polyvinyl alcohol (Elvanol 51-05—E. I. du Pont)

EXAMPLE 5

5% aqueous dispersion of methylvinyl ether/maleic anhydride resin (Gantrex AN-119—Antara Chemical Company)

EXAMPLE 6

25% aqueous dispersion of polyacrylic acid

EXAMPLE 7

10% aqueous dispersion of Methocel (Dow Chemical Company)

EXAMPLE 8

50% water dispersion of Dow Latex 464 (a copolymer of vinylidene chloride and acrylonitrile) (Dow Chemical Company)

EXAMPLE 9

56.3% water dispersion of Pliolite Latex 491 (a modified styrene/butadiene copolymer) (Goodyear Chemical Company)

In the foregoing examples, the amount of colloidal silica to polyvinylidene chloride in Example 1 can be varied within the range of 3 parts by weight of colloidal silica to 0.3 to 1.5 parts by weight of polyvinylidene chloride on the solids basis. In Example 3, the ratio of polyvinyl alcohol to polyvinylidene chloride can be varied within the range of 1 part by weight of polyvinyl alcohol to 0.5 to 4 parts by weight of polyvinylidene chloride on a solids basis. In Example 3, the ratio of polyvinyl acetate to polyvinylidene chloride may be varied within the range of 1 part by weight of polyvinyl acetate to 0.5 to 4 parts by weight of polyvinylidene chloride.

The compositions of Examples 1 to 9 may be cut with water for dilution to the desired viscosity for coating onto the plastic film. In practice, it is desirable to make use of a composition having a solids content within the range of 2–20% solids and preferably in the range of 2.5–10% by weight solids. The compositions are applied to the film surface in an amount to provide for a coating weight within the range of ⅛ to 6 pounds per 3,000 square feet of surface area and preferably within the range of ¼ to 2 pounds per 3,000 square feet of surface area. The even application of the coating compositions of Examples 1 to 9 may be enhanced, if necessary, by the addition of a small amount of a wetting agent—for example, 0.3 to 0.6% by weight of Atolene NR (a sulfated ester of oleic acid available from the Dexter Chemical Co.).

Application of the coating composition onto the film base 10 can be made by various conventional coating techniques, such as by roller coating, flow coating, dip coating and the like, preferably followed by an air knife or squeeze rolls to reduce the coating to the desired coating weight and to smooth the coating. The applied coating can be allowed to air dry or drying can be accelerated by passage of the coated film through an air drying oven at a temperature below 300° F. and preferably within the range of 100–220° F. Coating and drying is preferably carried out while the film is in roll form and before sheeting but coating of the sheeted film can be affected.

The transparent coated plastic film can be processed in the normal manner for spirit duplication with paper or the like impression medium. For this purpose, the coated surface of the film is first wet with the spirit fluid consisting of alcohol and preferably water and alcohol. The wetted surface of the film is pressed in surface contact with the imaged spirit master whereby the spirit soluble dyestuff in the image on the master is leached from the master for transfer to the wetted surface of the film for the development of the image 14 on the surface thereof which becomes set upon evaporation of the spirit fluid.

Because of the coating on the film, the spirit fluid uniformly and rapidly wets out the coated film surface whereby transfer from the imaged master to the film transparency is uniform and of sufficient concentration for contrast to enable projection. Although the coating is readily wet by the spirit fluid, it is at most slowly soluble and preferably insoluble in the fluid so as to provide a stable surface. Because of the coating on the film, the transferred image adheres strongly to the film to remain strongly anchored thereon whereby the single coated film can be used with multiple imaged masters for multiple color transfer to form multi-colored images on the single sheet.

Further, because of the properties contributed by the coating on the film, the coated film can be processed through conventional spirit duplicating equipment for feeding alone or in combination with impression paper without alteration of the conditions or elements employed in spirit duplication.

It will be understood that changes may be made in the details of formulation and operation without departing from the spirit of the invention, especially as defined in the following claims.

We claim:

1. A film transparency comprising a transparent film of plastic material, a transfer anchor coat on one surface of the film which coating is wettable by the fluids used in spirit duplication and which is receptive to the spirit soluble dyestuffs transferred from the imaged master to the coated film by spirit duplication and in which the coating is formed of colloidal silica and polyvinylidene chloride present in the ratio of 3 parts by weight of colloidal silica to 0.3 to 1.5 parts by weight of polyvinylidene chloride, and a spirit soluble dye image on the coated surface of the film deposited on the surface of the film wetted with a spirit fluid while in pressure contact with an imaged spirit master.

2. A film transparency as claimed in claim 1 in which the film is formed of a material selected from the group consisting of a polyester resin, cellulose acetate and a polystyrene resin.

3. A film transparency as claimed in claim 1 in which the image is formed of multiple colors in proper registry.

References Cited

UNITED STATES PATENTS

| 2,288,152 | 6/1942 | Bjorksten | 117—35.6 |
| 3,146,883 | 9/1964 | Harlan et al. | 117—161 X |
| 3,310,404 | 3/1967 | Bach | 101—473 X |

FOREIGN PATENTS

| 692,154 | 5/1953 | Great Britain. |

WILLIAM D. MARTIN, Primary Examiner

J. E. MILLER, JR., Assistant Examiner

U.S. Cl. X.R.

101—473; 117—76, 138.8, 145, 161